United States Patent [19]

Coutant et al.

[11] Patent Number: 4,949,823
[45] Date of Patent: Aug. 21, 1990

[54] CONTROL SYSTEM AND LOGIC SYSTEM FOR INDEPENDENT CONTROL OF VEHICLE BRAKES

[75] Inventors: Alan R. Coutant, Chillicothe; David M. Fee, Groveland, both of Ill.

[73] Assignee: Caterpillar Inc., Peoria, Ill.

[21] Appl. No.: 373,311

[22] Filed: Jun. 29, 1989

[51] Int. Cl.$^5$ .............................................. B60K 41/26
[52] U.S. Cl. ..................................... 192/4 C; 180/6.2
[58] Field of Search ................ 192/4 R, 9, 13 R, 4 C; 180/6.2, 6.44

[56] References Cited

U.S. PATENT DOCUMENTS

| | | | |
|---|---|---|---|
| 2,336,911 | 12/1943 | Zimmermann | 180/6.44 |
| 2,712,370 | 7/1955 | Westfall | 192/13 R |
| 3,288,232 | 11/1966 | Shepherd | 180/6.2 |
| 3,461,744 | 8/1969 | Booth | 74/720.5 |
| 4,307,796 | 12/1981 | Hakes et al. | 192/87.13 |
| 4,505,168 | 3/1985 | Booth et al. | 180/6.44 |
| 4,541,497 | 9/1985 | Riediger et al. | 180/6.48 |
| 4,700,794 | 10/1987 | Bernhagen et al. | 180/6.44 |
| 4,702,358 | 10/1987 | Mueller et al. | 192/13 R |

FOREIGN PATENT DOCUMENTS

| | | | |
|---|---|---|---|
| 2011913 | 10/1971 | Fed. Rep. of Germany | 180/6.2 |
| 56-39964 | 4/1981 | Japan | 180/6.2 |
| 60-4469 | 1/1985 | Japan | 180/6.2 |

*Primary Examiner*—Rodney H. Bonck
*Attorney, Agent, or Firm*—J. W. Burrows

[57] ABSTRACT

Vehicle propulsion systems many times have a transmission with a directional control mechanism, right and left drive units, and a differential steer mechanism. In these vehicles, there is no way of independently stopping one of the drive units in order to provide a pivot turn for better control of the vehicle when maneuvering in tight areas and on slopes. In order to ensure that the operator has selective, independent control of applying one or the other of the right or left brakes for steering, a control and a logic system is provided in a propulsion system to automatically apply the right or left brake on the respective drive unit with respect to operator input conditions. In this arrangement, if the operator selects a clockwise steer of the vehicle, it will steer in the clockwise direction regardless of whether the vehicle is moving in the forward direction or the reverse direction. Likewise, the same is true if the operator selects a counterclockwise steer direction of the vehicle. This is accomplished by the control and logic systems sensing the travel direction of the vehicle, the steer direction of the vehicle, and automatically applying the proper brake based on the input conditions. The control and logic systems set forth herein provides a selective independent control of the respective right and left brakes to provide more precise control of the vehicle when operating in tight areas and on slopes.

28 Claims, 3 Drawing Sheets

Fig. 1.

CONTROL SYSTEM AND LOGIC SYSTEM FOR INDEPENDENT CONTROL OF VEHICLE BRAKES

TECHNICAL FIELD

This invention relates generally to the control of brakes in a vehicle and more particularly to a logic system for providing selective, independent control of the vehicle brakes.

BACKGROUND ART

Vehicles having positive power flow from the engine to the opposite drive units of a vehicle during steering without having to have duplicate pumps and motors on each side of the vehicle has gained in popularity. These vehicles have been generally called differential steer vehicles. A better understanding of the operation of vehicles having differential steer capabilities can be had by referring to U.S. Pat. No. 4,434,680 issued Mar. 6, 1984 to C. W. Riediger et al and assigned to Caterpillar Inc.

Since in differential steer vehicles steering is obtained by changing the relative speed between the opposite drive units, there is no way to ensure that one drive unit can be totally stopped in order to achieve a pivot turn. Under certain conditions, the operator may be able to achieve a pivot turn by making a steer input which provides a differential speed between the opposite drive units that matches the maximum predetermined differential speed of the differential mechanism. Under these conditions, one drive unit would be stationary and the other drive unit would be moving at the maximum differential speed. However, being able to select this exact position is quite difficult.

Furthermore, it is desirable to be able to selectively control the stopping of one of the drive units in order to achieve better control of the vehicle when maneuvering in tight areas or on slopes while still maintaining the advantage of power being continually available to each drive unit. Additionally, it is desirable in many applications to have the vehicle rotate or steer in the same direction regardless of vehicle travel direction. This means that upon the operator making a steer input to steer the vehicle counterclockwise, the vehicle will turn counterclockwise regardless of it being operated in the forward or reverse direction.

U.S. Pat. No. 4,307,796 which issued on Dec. 29, 1981 to Gary A. Hakes et al teaches a vehicle clutch and brake steering control system. In this arrangement, the vehicle is steered by interrupting power to one of the drive units by releasing a clutch and stopping the released drive unit by subsequently applying a brake. This allows independent braking of the opposite drive units of the vehicle but has the disadvantage of not having continual power available to both the right and left drive units during steering of the vehicle.

U.S. Pat. No. 4,541,497 which issued on Sept. 17, 1985 to Craig W. Riediger et al teaches a control mechanism for operating a tractor having differential steer. In this arrangement, a tiller bar is used to make a steer input by rotating the tiller bar about its vertical axis. Movement of the tiller bar in one direction initiates a vehicle steer which results in the vehicle turning clockwise while movement of the tiller bar in the opposite direction initiates a steer in which the vehicle is turning in a counterclockwise direction. Regardless of the vehicle traveling in a forward direction or in a reverse direction, movement of the tiller bar in the clockwise direction results in the vehicle turning in a clockwise direction. Likewise, movement of the tiller bar in a counterclockwise direction results in the vehicle turning counterclockwise regardless of whether the vehicle is traveling in the forward direction or the reverse direction. Even though this arrangement has a differential steer mechanism, there is no ability to selectively, independently apply the brakes on one of the drive units without applying the brake on the other drive unit.

U.S. Pat. No. 4,700,794 which issued Oct. 20, 1987 to James R. Bernhagen et al teaches a vehicle steering control apparatus for use on a vehicle having differential steer capability. In this arrangement, a steering wheel is used to make vehicle steer input and it was desirable to have the vehicle steer in the manner quite similar to the "C" type steering of an automotive type vehicle. Consequently, in order to provide a "C" type steer when going from forward to reverse direction, it was necessary to provide a switching valve to change the rotation of the steer motor which provides the differential control to the differential steer mechanism. In this arrangement, there is no selective, independent control of the brake on one drive unit independent of the brake on the other drive unit.

The present invention is directed to overcoming one or more of the problems as set forth above.

DISCLOSURE OF THE INVENTION

In one aspect of the present invention, a control system and a logic system are provided and adapted for use in a vehicle having a source of control power operative to produce a control signal. The vehicle has right and left drive units operatively coupled with the transmission to provide directional control thereto, right and left brakes for selectively stopping the respective right and left drive units, and brake engagement actuation means for controlling engagement of the right and left brakes. The vehicle also has differential steer means for providing a differential speed between the right and left drive units for steering of the vehicle. A control system is provided and includes input control means for conditioning the transmission to the selected direction. A logic system includes means for sensing the vehicle travel direction and for operatively transmitting the control signal from the source therethrough responsive to the sensed direction of the vehicle, and means for sensing the vehicle steer direction and for operatively transmitting the control signal received from the vehicle travel direction sensing and transmitting means to the brake engagement actuating means so that the right or left brake can be selectively, independently applied during steering of the vehicle.

In another aspect of the invention, a control system and a logic system are provided and adapted for use in a vehicle having differential steer means for providing a differential speed between the right and left drive units to steer the vehicle. The logic system includes means for sensing the vehicle travel direction and for operatively transmitting a control signal therethrough responsive to the sensed direction of the vehicle, and means for sensing the vehicle steer direction and for operatively transmitting the control signal received from the vehicle travel direction sensing and transmitting means to a brake engagement actuating means so that the right or left drive units can be selectively, independently braked during steering of the vehicle.

In yet another aspect of the present invention, a vehicle propulsion system is provided having a transmission to provide forward and reverse travel of the vehicle, right and left drive units operatively coupled with the transmission, and differential steer means for providing a speed difference between the right and left drive units for steering of the vehicle. The differential steer means is operatively coupled between the transmission and the right and left drive units. A control system is provided and includes input control means for controlling the direction of the vehicle and steer input means for establishing the direction of steer. The steer input means is operatively associated with the differential steer means and is moveable within an operative range. The vehicle propulsion system further includes logic means for selectively, independently permitting braking one or the other of the right and left drive units in response to the input control means and the steer input means being moved to predetermined positions within their respective operative ranges.

The present invention provides a logic system which responsive to the direction of travel and the desired steer input automatically applies the proper brake on the respective drive unit independent of the other brake. The logic system can be hydraulic, electrical, or mechanical or any combination thereof without departing from the essence of the invention. In this arrangement, when the vehicle is being operated in the forward direction with a given steer input and the direction of the vehicle is changed to a reverse direction, the logic system automatically senses the change and applies the brake of the drive unit on the opposite side without the operator having to make any special adjustments. The subject arrangement provides the operator with selective, independent control of the brake on the respective drive units during steering in order for the vehicle to be pivot. This allows better vehicle control in tight areas and also provides better vehicle control when operating on slopes.

BEST MODE FOR CARRYING OUT THE INVENTION

Figure 1:
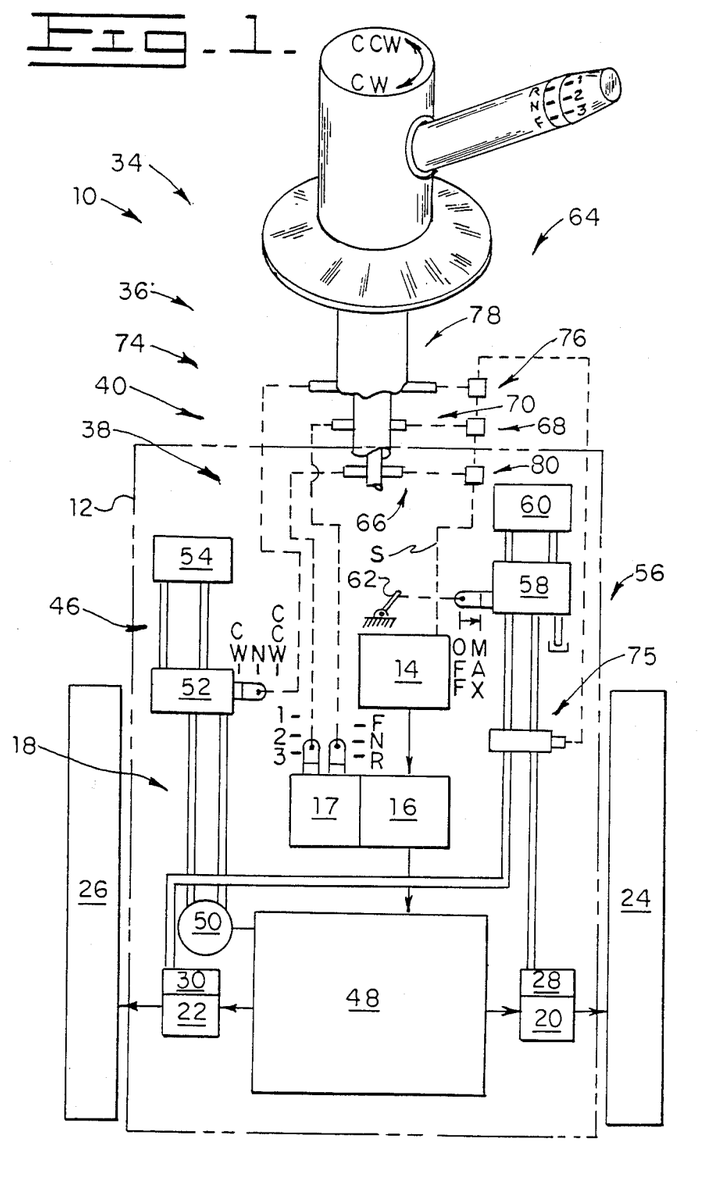
FIG. 1 is a partial schematic and diagrammatic representation of a vehicle propulsion system incorporating the present invention.

Referring now to the drawings, and more particularly to FIG. 1, a vehicle propulsion system 10 is generally shown for use in a vehicle 12 to selectively propel the vehicle. The vehicle propulsion system 10 includes a source of control power 14 for controlling the vehicle and providing a control signal "S", a transmission 16, a transmission control means 17, and a differential steer means 18 operatively connected to the output of the transmission 16. The transmission is operative to provide a plurality of speeds in both a forward and reverse direction. The propulsion system 10 also includes right and left final drive units 20,22 operatively connected to the outputs of the differential steer means 18 to drive respective right and left drive units 24,26. Right and left brakes 28,30 are operatively associated with the respective right and left final drive units 20,22 to provide a braking force for stopping of the respective right and left drive units 24,26. Each of the right and left brakes 28,30 are spring applied and pressure released. It is recognized that the respective brakes 28,30 could be pressure applied and spring released without departing from the essence of the invention.

The vehicle propulsion system 10 further includes a control system 34 for controlling the operation of the vehicle. The control system 34 includes an input control means 36 associated with the transmission 16. The input control means 36 includes a directional control mechanism 38 operative through the transmission control means 17 to select a neutral "N", forward "F", or reverse "R" direction of vehicle movement. The input control means 36 also includes a selector control means 40 for selecting respective ones of the plurality of speeds "1, 2, 3" of the transmission 16. The control system 34 includes a steer input means 46 operatively associated with the differential steer means 18 for establishing the direction of steer of the vehicle 12 and the degree of steer between a neutral "N", clockwise "CW", and counterclockwise "CCW" positions. The differential steer means 18 also includes a differential steer mechanism 48 for receiving the driving force from the transmission 16 and directing the driving force to the respective drive units 24,26 through the respective right and left final drive units 20,22. The differential steer means 18 includes a steering motor 50 operatively connected to the differential steer mechanism 48 to selectively establish a difference in output speeds between the respective right and left final drive units 20,22 to provide steering of the vehicle 12. The steering motor 50 is controlled by a steering valve 52 which receives its fluid from a fluid pressure source 54. Brake engagement actuation means 56 is provided for controlling engagement of the right and left brakes 28,30 and includes a brake control valve 58 connected to a fluid pressure source 60. The brake control valve 58 is selectively operable by a service brake pedal 62 between an off and maximum braking positions in a conventional manner to simultaneously apply both the right and left brakes 28,30.

As is well known in the art, when the vehicle 12 is in the neutral travel direction, operation of the differential steer mechanism 48 produces a spot turn. That is, one of the drive units 28,30 turns in one direction while the other one of the drive units 28,30 turns in the opposite direction. If the vehicle 12 is travelling in a forward or reverse direction, at a sufficiently slow travel direction, operation of the steer mechanism 48 results in one of the drive units 28,30 turning in one direction at one rate while the other one of the drive units 28,30 is turning the opposite direction at a slower rate. This is based on the fact that steering is accomplished by inducing a speed differential between the opposite drive units 28,30. Consequently, if one of the drive units 28,30 is turning slower than the differential speed induced due by the steer input, the one drive unit 28 30 will turn in the opposite direction at a rate equal to the difference between the directional speed and the speed difference to the one drive unit 28 30 as induced by the steer input.

A logic system 64 is included for selectively, independently controlling the braking of either one of the right and left drive units 24,26. The logic system 64 includes means 66 for sensing the travel direction of the vehicle 12 and for operatively transmitting the control signal "S" received from the source of control power 14 therethrough responsive to the sensed direction of the vehicle. The vehicle travel direction sensing means 66 includes a direction switch means 68 for selectively directing the control signal "S" received from the source of control power 14 thereacross and direction switch actuation means 70 for conditioning the direction switch means 68 to pass the control signal "S" thereacross.

The logic system 64 also includes means 74 for sensing the vehicle steer direction and for operatively transmitting the control signal "S" received from the vehicle travel direction sensing means 66 to the brake engagement actuation means 56. The logic system 64 includes a means 75 for permitting actuation of the selected right or left brake 28,30 and is operatively associated with the brake actuation means 56. The vehicle steer direction sensing means 74 includes a steer switch means 76 for selectively directing the control signal "S" received from the vehicle travel direction sensing means 66 thereacross. The vehicle steer direction sensing means 74 also includes steer switch actuation means 78 for conditioning the steer switch means 76 to pass the control signal "S" thereacross to the selector means 75 for actuation of the selected right or left brake 28, 30 in response to the steer input means being moved to one of the clockwise "CW" and counterclockwise "CCW" steer positions.

The logic system 64 further includes a control power switch 80 which is disposed in the vehicle propulsion system 10 between the source of control power 14 and the vehicle travel direction sensing means 66. The control power switch 80 is operative to pass the control signal "S" from the source 14 of control power to the vehicle travel direction sensing means 66 only when the transmission 16 is being operated in its first speed "1".

Figure 2:
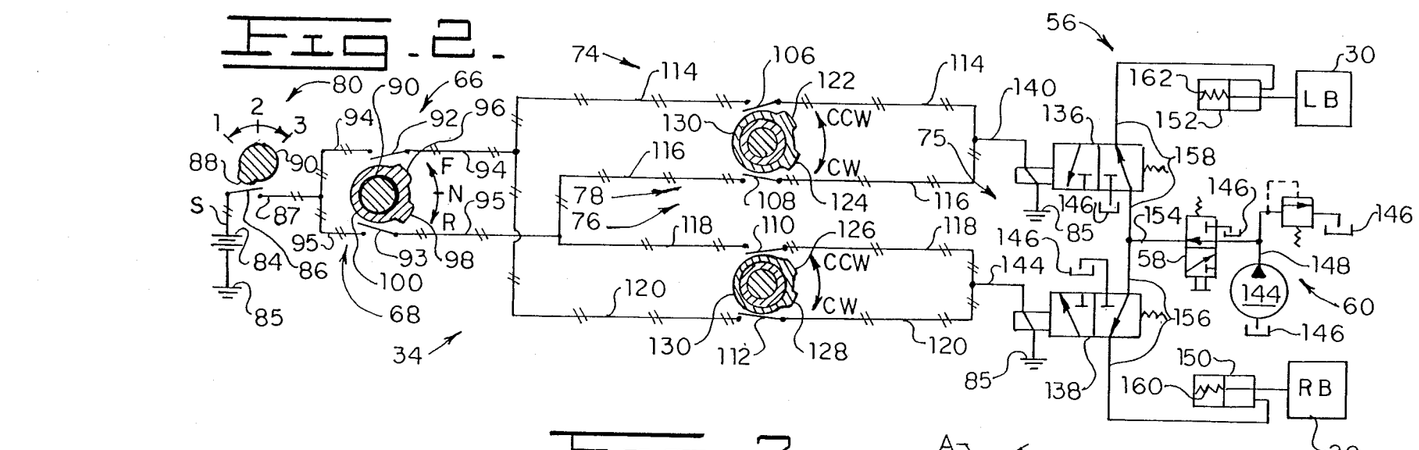
FIG. 2 is a schematic which is a partial electrical and a partial hydraulic schematic illustrating one embodiment of the present invention.

Referring now to FIG. 2, one embodiment of the present invention is disclosed. In this embodiment, the source of control power 14 is an electrical output mechanism, such as a battery 84 with a ground 85 which is operatively associated with an engine (not shown). The electrical signal "S" from the battery 84 is directed to the control power switch 80 which includes a normally open electrical switch 86 located in an electrical line 87 and a cam 88 formed on a shaft 90 of the selector control means 40. The cam 88 is operative to close the switch 86 when the selector control means 40 is moved to the first speed position "1" thus allowing the electrical signal "S" to flow thereacross.

The direction switch means 68 of the vehicle travel direction sensing means 66 includes first and second normally open electrical switches 92,93. The first and second normally open electrical switches 92,93 are located in respective first and second electrical lines 94,95. Both of the electrical lines 94,95 are connected to the electrical line 87 of the control power switch 80. The direction switch actuation means 70 includes first and second cams 96,98 integrally formed on a shaft 100 of the directional control mechanism 38 (FIG. 1). Upon movement of the directional control mechanism 38 to the forward "F" position, the cam 96 closes the first normally open switch 92 while movement of the directional control mechanism 38 to the reverse "R" position closes the second normally open electrical switch 93.

The steer switch mean 76 of the vehicle steer direction sensing mean 74 includes respective first, second, third and fourth normally open electrical switches 106,108,110,112 each being located in respective electrical lines 114,116,118,120. The first and fourth electrical lines 114,120 are connected to the first electrical line 94 of the vehicle travel direction sensing means 66 while the second and third electrical lines 116,118 are connected to the second electrical line 95 of the vehicle travel direction sensing means 66. The steer switch actuation means 78 of the vehicle steer direction sensing means 74 includes first, second, third and fourth cams 122,124,126,128 integrally formed on a shaft 130 of the steer input means 46 (FIG. 1). Movement of the steer input means 46 to the clockwise "CW" position results in the second and fourth cams 124,128 simultaneously closing the second and fourth electrical switches 108,112. Movement of the steer input means 46 to the counterclockwise "CCW" position results in the first and third cams 122,126 closing the first and third electrical switches 106,110.

The brake selector means 75 of the brake engagement actuation means 56 includes first and second normally open, two position, solenoid actuated control valves 136,138. The solenoid of the first solenoid actuated valve 136 is connected to the first and second electrical lines 114,116 of the vehicle steer direction sensing means 74 by an electrical line 140 and to the common ground 85. The solenoid of the second solenoid actuated valve 138 is connected to the third and fourth electrical lines 118,120 by an electrical line 144 and to the common ground 85.

The fluid pressure source 60 includes a pump 144 for pressurizing fluid received from a reservoir 146 and directing the pressurized fluid to the brake control valve 58 through a conduit 148. The brake control valve 58 has a first position at which the fluid pressure from the pump 144 is directed therethrough to first and second respective actuators 150,152 of the respective right and left spring applied, pressure released brakes 28,30 through a conduit 154 and branch conduits 156,158. The brake control valve 58 is moveable from the first position to a second position at which pressurized fluid from the pump 144 is blocked and the fluid from the actuators 150,152 is vented to the reservoir 146. A spring 160 in the first actuator 150 biases the first actuator against the force of the pressurized fluid being introduced to the first actuator 150 through the conduit 156 while a spring 162 biases the second actuator 152 against the force of the pressurized fluid introduced to the second actuator through the conduit 158. The first and second solenoid actuated valves 136,138 are located in the respective conduits 158,156 and operative in their first position to allow fluid flow to pass therethrough and operative in their second position to block pressurized fluid flow therethrough and to vent the pressurized fluid in the respective actuators 150,152 to the reservoir 146. Venting of the pressurized fluid in the actuators 150,152 permits the respective springs 160,162 to apply the respective brakes 28,30.

Figure 3:
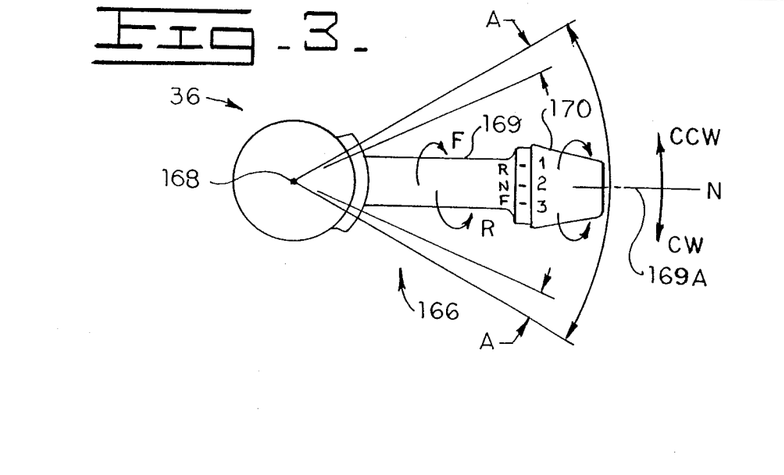
FIG. 3 is an enlarged diagrammatic drawing representing a tiller bar lever utilized for providing a steer input to the vehicle.

Referring now to FIG. 3, a portion of the input control means 36 is illustrated to better teach the operation thereof. The input control means 36 has a tiller arm 166 which is pivotable about a vertical axis 168 from a neutral position "N" towards a clockwise position "CW" or to a counterclockwise position "CCW". The degree of movement from the neutral position "N" towards either of the clockwise "CW" or counterclockwise positions "CCW" determines the degree of steer of the vehicle 12. Furthermore, once the tiller arm 166 is rotated to a brake applied range of travel "A" which is near its extreme position in either direction, the respective right brake 28 or left brake 30 is automatically engaged as determined by the logic system 64. It is recognized from a review of FIG. 2 that in order for either of the brakes 28,30 to be applied, the transmission must be in the first speed "1" and the vehicle must be moving in the forward "F" or the reverse "R" direction in order for the electrical signal "S" to pass therethrough to activate the proper one of the solenoid actuated valves 136,138. The tiller arm 166 has a handle grip 169 that is twistable about an axis 169A of the tiller arm 166 in order to condition the transmission 16 for movement in the forward or reverse directions. Furthermore, the tiller arm 166 has a twist knob 170 rotatable about the axis 169A of the tiller arm 166 for conditioning the transmission 16 to the proper selected speed. It should be recognized that the twist knob 170 and the twist grip 169 rotate independently about the common axis 169A of the tiller arm 166.

Figure 4:
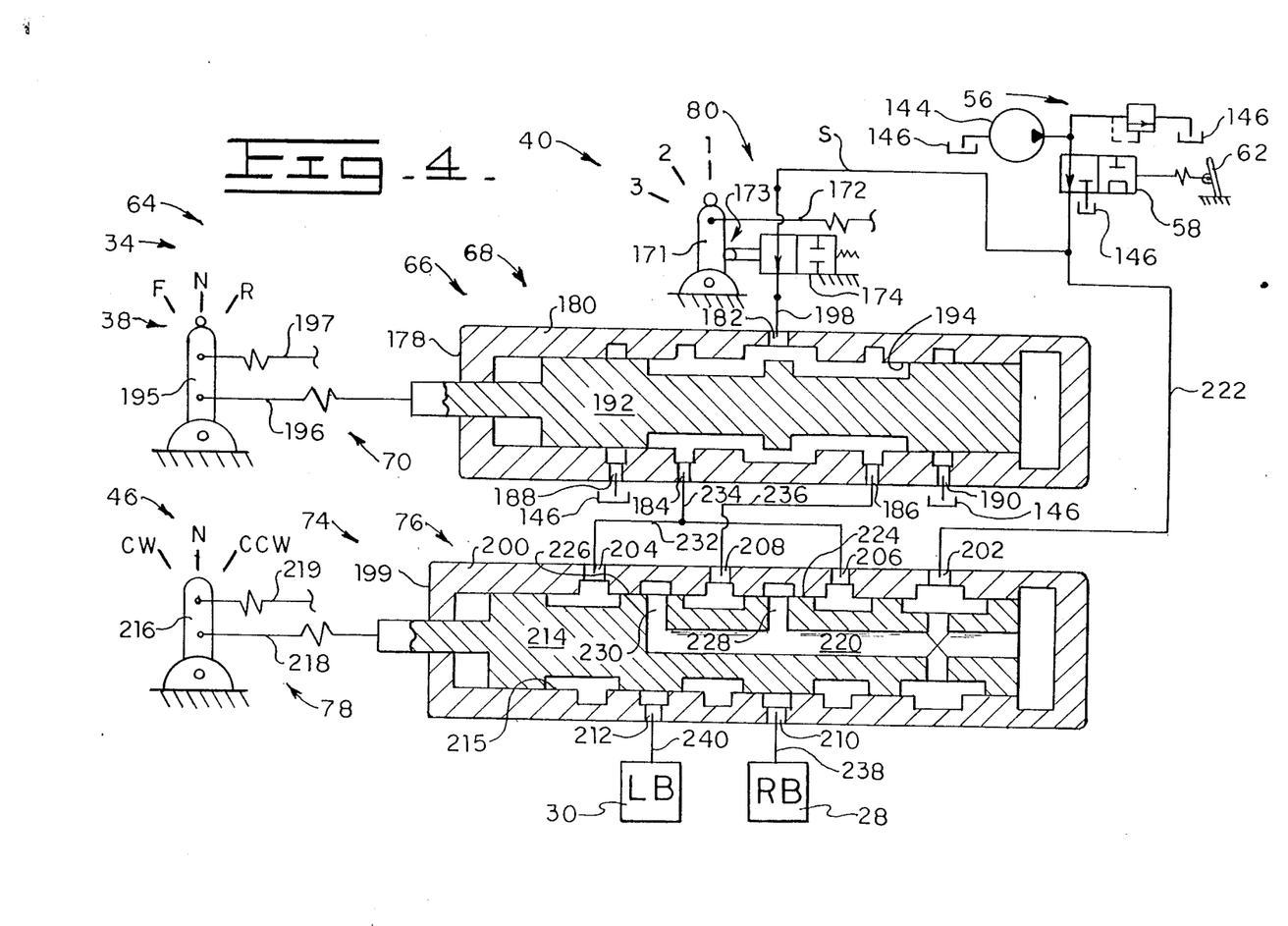
FIG. 4 is a partial hydraulic schematic and a partial diagrammatic representation illustrating another embodiment of the present invention.

Referring now to FIG. 4, another embodiment of the logic system 64 is set forth. In this embodiment, the source of control power 14 is a source of pressurized fluid, such as the hydraulic pump 144. It should be recognized that the source of pressurized fluid could be a separate pump, but in this embodiment the source of pressurized fluid is the same as the hydraulic pump 144 of the fluid pressure source 60.

The selector control means 40 includes a lever 171 operatively connected to the transmission 16 by a cable 172 and moveable between first "1", second "2" and third "3" positions to respectively condition the transmission to first, second and third speeds. The selector control means also includes means 173 for actuating the control power switch 80. The actuating means 173 is integral with the lever 170. The control power switch 80 includes a normally closed two position valve 174 which is moveable to its open position in response to engagement with the actuation means 173 when the lever 170 of the selector control means 40 is in the first speed position "1".

The directional switch means 68 includes a three position direction control valve 178. The three position directional control valve 178 has a housing 180 defining an inlet port 182, first and second outlet ports 184,186, first and second drain ports 188,190 and a direction control valving element 192 moveable in a bore 194 defined in the housing 180. The valving element 192 is connected to a direction lever 195 of the directional control mechanism 38 by a cable 196 and is moveable from a neutral position "N" to forward "F" and reverse "R" positions. A cable 197 connects the direction lever 195 to the transmission control means 17 and is operative to condition the transmission 16 to the selected travel direction. The inlet port 182 of the direction control valve 178 is connected to the two position valve 174 of the control power switch 80 by a conduit 198. The valving element 192 is moveable from the neutral position "N" at which the inlet port 182 is in open communication with both the first and second outlet ports 184,186 to the forward position "F" at which the inlet port 182 is in open communication with the second outlet port 186 and the first outlet port 184 is in open communication with the first drain port 188. When the valving element 192 is moved to the reverse position "R", the inlet port 182 is in open communication with the first outlet port 184 and the second outlet port 186 is in communication with the second drain port 190.

The steer switch means 76 includes a three position steer control valve 199 moveable in response to the steer input means 46 from a neutral position "N" towards a clockwise "CW" and a counterclockwise "CCW" position. The three position steer control valve 199 includes a housing 200 defining an inlet port 202, first, second, and third inlet/outlet ports 204,206,208, first and second outlet ports 210,212 and a valving element 214 moveable in a bore 215. The valving element 214 is moveable from the neutral position "N" towards the clockwise position "CW" and the counterclockwise position "CCW" by a lever 216 and the cable 218 connected thereto. A cable 219 connects the steer lever 216 to the steering valve 52 to control steering of the vehicle. The steer control valving element 214 has an internal passage 220 in continuous communication with the brake control valve 58 through the inlet port 202 and a conduit 222. The valving element 214 also includes first and second annular lands 224,226 laterally spaced from one another and first and second internal branch passages 228,230 respectively interconnecting the internal passage 220 with the outer surface of the respective first and second lands 224,226.

With the valving element 214 in its neutral position "N", the first, second and third outlet ports 204,206,208 are blocked and the inlet port 202 is in continuous communication with the right and left brakes 28,30 through the respective first and second outlet ports 210,212, the internal branch passages 228,230, and the internal passage 220. Upon moving the valving element 214 to its clockwise position "CW", the first and second internal branch passages 228,230 are blocked, the third inlet/outlet port 208 is in open communication with the second outlet port 212 and the first outlet port 210 is in open communication with the second inlet/outlet port 206. Likewise, when the valving element 214 is in the counterclockwise position "CCW", the first and second internal branch passages 228,230 are blocked, the third inlet/outlet port 208 is in open communication with the first outlet port 210, and the second outlet port 212 is in open communication with the first inlet/outlet port 204. The first and second inlet/outlet ports 204,206 are interconnected by a common conduit 232 and the common conduit 232 is connected to the first outlet port 184 of the direction control valve 178 by a conduit 234. The third inlet/outlet port 208 is connected to the second outlet port 186 of the direction control valve 178 by a conduit 236. The first outlet port 210 of the steer control valve 198 is connected to the right brake 28 by a conduit 238 and the second outlet port 212 is connected to the left brake 30 by a conduit 240.

It is recognized that various forms of the logic system 64 could be utilized without departing from the essence of the invention. Furthermore, it is recognized that vehicle propulsion systems having components different from those set forth herein but which functional operate the same could be utilized in the subject arrangement without departing from the essence of the invention. Likewise, various combinations of hydraulic, electronic, and mechanical controls could be intermixed to achieve the same objectives of the logic system set forth herein.

INDUSTRIAL APPLICABILITY

In the operation of the vehicle propulsion system 10, the control system 34 and the logic system 64 as generally shown in FIG. 1 and the embodiment as further defined in FIG. 2, the logic system 64 and the control system are illustrated with the vehicle 12 being in the second gear position "2" and in a neutral travel direction "N" without a steer input being made thereto. By rotating the shaft 90 of the selector control means 40 to the first gear position "1", the cam 88 closes the switch 86 allowing the electrical signal "S" from the battery 84 to pass through the electrical line 87. The electrical signal "S" from the first switch 86 is simultaneously directed through the first and second electrical lines 94,95 to the first and second normally open switches 92,93. By moving the shaft 100 of the direction control mechanism 38 to its forward position "F", the cam 96 thereof closes the switch 92 allowing the electrical signal "S" to pass through the electrical line 94. The electrical signal "S" is simultaneously directed through the electric lines 114,120 to the respective open electrical switches 106,112. Upon making a steer input by rotating the shaft 130 of the steer input means 46 to the clockwise position "CW", the cams 124,128 closes the respective second and fourth electrical switches 108,112. Since the electrical signal "S" is available at the fourth switch 112, the electrical signal "S" passes therethrough and is directed to the solenoid of the second solenoid actuated valve 138. The electrical signal "S" energizes the solenoid resulting in the valve moving from its first, open position to its second, closed position wherein the pressurized fluid in the actuator 150 is vented to the reservoir 146 and the spring 160 of the actuator 150 applies the right brake 28 causing the vehicle to pivot turn in a clockwise direction.

When rotating the shaft 130 in the counterclockwise direction "CCW" from the neutral position "N", the cams 122,126 closes the respective first and third electrical switches 106,110. Since the electrical signal "S" is still present at the switch 106, the signal passes through the electrical line 114 to the first solenoid actuated valve 136. The electrical signal "S" acting on the solenoid thereof moves the solenoid valve 136 from its first, open position to its second, closed position in which the source of pressurized fluid 144 is blocked from the actuator 152 and pressurized fluid in the actuator 152 is vented to the reservoir 146. Consequently, the spring 162 of the actuator 152 applies the left hand brake 30 causing the vehicle 12 to pivot steer in a counterclockwise direction. Anytime the shaft 130 is rotated to a position at which the steer input means 46 is in its neutral position "N", both of the solenoid actuated, two position valves 136,138 are in their first open position. In the first position thereof, the pressurized fluid from the pump 144 passes therethrough to pressurized both the first and second actuators 150,152 moving them against the bias of the respective first and second springs 160,162 to hold the right and left brakes 28,30 in their released condition. Furthermore, the operator may apply both of the brakes 28,30 simultaneously by depressing the brake pedal 62 thus moving the brake control valve 58 from its first position to its second position. This effectively blocks pressurized fluid from being directed therethrough and vents the pressurized fluid from the first and second actuators 150,152 to the reservoir 146 thus allowing the springs 160,162 to apply both of the first and second brakes 28,30.

Upon moving the shaft 100 of the direction control mechanism 38 from the forward position "F" to the reverse position "R", the first electrical switch 92 opens and the cam 98 on the shaft 100 thereof closes the second normally open electric switch 93 allowing the electrical signal "S" to pass through the electrical line 95. The electrical signal "S" in the electrical line 95 from the switch 93 is simultaneously directed through the second and third electrical lines 116,118 to the second and third normally open electrical switches 108,110. Upon rotation of the steer shaft 130 to the clockwise position "CW", the second and fourth cams 124,128 thereon closes the respective second and fourth electrical switches 108,112. Since the electrical signal "S" is available in the electrical line 116, the electrical signal "S" is directed across the closed switch 108 through the electrical lines 116,140 to the solenoid of the first solenoid actuated control valve 136. The electrical signal "S" acting on the solenoid thereof moves the two position solenoid actuated valve 136 from its first open position to its second, closed position. In the second, closed position thereof, the pressurized fluid from the source 144 to the second actuator 152 is blocked and the pressurized fluid in the second actuator 152 is vented to the reservoir 146 allowing the spring 162 to apply the left brake 30. Application of the left brake 30 results in the vehicle pivot turning in a clockwise direction. Even though there is an electrical signal present in the electrical line 118 upstream of the switch 110, it cannot pass through the switch 110 since the switch 110 remains open.

Upon the operator rotating the steer shaft 130 to the counterclockwise position "CCW", the cams 122,126 close the respective first and third electrical switches 106,110. Since the electrical signal "S" is present in line 118, the electrical signal "S" is directed across the closed switch 110 through the electrical line 118 to the second solenoid actuated control valve 138. The electrical signal "S" acting on the solenoid moves the second solenoid actuated valve 138 from its first, open position to its second, closed position at which the pressurized fluid from the pump 144 is blocked and the pressurized fluid in the first actuator 150 is vented to the reservoir 146. Consequently, the spring 160 applies the right brake 28. Application of the right brake 28 results in the vehicle 12 pivot steering in the counterclockwise direction.

If the operator shifts the vehicle from the first speed "1" to the second "2" or the third "3" speed positions, the electrical switch 86 opens interrupting the electrical signal "S" therethrough. Consequently, regardless of the direction the vehicle is traveling or the direction the vehicle is steering, neither of the first or second brakes 28,30 may be selectively, independently applied. Even though in the subject arrangement, the right and left brakes 28,30 may only be independently applied when the vehicle is operating in the first speed, it is further recognized that the invention is likewise workable with the vehicle operating at other speeds as long as the electrical signal "S" is allowed to pass thereacross. In the subject arrangement, it is preferred to independently control the right and left brakes 28,30 only in the first speed condition, since the subject vehicle travels at a faster rate when being operated in the second or third speeds. Thus, it is not practical, when operating at an elevated speed, to totally stop either of the drive units 24,26 by engaging the respective one of brakes 28,30.

Referring to FIG. 3, the tiller arm 166 is moveable about the vertical axis 168 through an arc in the clockwise and the counterclockwise directions "CW,CCW". Movement from neutral "N", in either the clockwise or counterclockwise direction, determines the degree of steer of the vehicle 12. More specifically, small movements one way or the other causes the vehicle to turn in a large radius whereas movement further from neutral "N" causes the vehicle to turn in a shorter radius. As previously mentioned, upon reaching the brake applied range of travel "A" of the tiller arm 166, the respective right or left brake will be applied as determined by the logic system 64. Consequently, the operator has the ability to steer the vehicle without applying either of the brakes 28,30 independently or he has the opportunity to move the tiller arm 166 to the brake applied range of travel "A" and automatically apply one of the brakes 28,30 as determined by the logic system 64. Likewise as previously noted the tiller arm 166 also has a hand twist grip 169 for determining, by twisting the grip 169, the direction of the vehicle travel. Furthermore, the tiller arm 166 has a twist knob 170 which can be twisted relative to the axis 169A to determine the speed of the vehicle 12.

In the operation of FIG. 4, the hydraulic pump 144 provides the hydraulic pressurized fluid for control of the brake system in general. Also in this embodiment, the pump 144 serves as the source of control power 14 to produce the signal "S" for the logic system 64. The operation of the service brakes 28,30 in this embodiment is the same as that in the previous embodiment in which movement of the brake pedal 62 moves the brake control valve 58 to its second position to vent the pressurized fluid therefrom and apply the brakes. The pressurized fluid which is effectively being utilized to release the spring applied brakes 28,30 is directed from the brake control valve 58 to the respective right and left brakes 28,30 through the three position steer control valve 199 as long as the three position steer valve 199 is in the neutral position "N".

When operating the vehicle 12, the operator selects the speed of travel by moving the speed lever 170 of the selector control means 40 to one of its first "1", second "2", or third "3" positions. When being operated in its first position "1", the lever 170 moves the two position valve 174 of the control switch means 80 from its blocking position to its second, open position allowing the fluid pressure signal "S" from the pump 144 to pass therethrough to the inlet port 182 of the three position direction control valve 178. The pressure signal "S" from the pump 144 is only available to the inlet port 182 when the vehicle 12 is being operated in its first position "1" which is representative of first gear. As long as the vehicle 12 remains in its neutral direction position "N", the fluid pressure signal "S" at the inlet port 182 passes therethrough to the first and second outlet ports 184,186 and to the first, second, and third inlet/outlet ports 204,206,208 of the three position steer control valve 199. Since the three position steer control valve 199 is in its neutral position "N", each of the inlet/outlet ports 204,206,208 are effectively blocked by the valving element 214 thereof. Upon movement of the direction lever 195 to the forward position "F", the pressure signal "S" from the pump 144 is directed only to the second outlet port 186 while the first outlet port 184 is in fluid communication with the first drain port 188. Again, as long as the steer lever 216 remains in its neutral position "N", the pressure signal "S" available to the third inlet/outlet port 208 remains blocked by the valving element 214 of the three position steer control valve 199 and the right and left brakes 28,30 remain disengaged since pressurized fluid from the pump 144 remains in communication therewith through the inlet port 202.

Movement of the steer lever 216 of the steer input means 46 to the clockwise position "CW", while the direction lever 195 remains in its forward position "F", results in the third inlet/outlet port 208 being in open communication with the left brake 30 through the second outlet port 212 while the right brake 28 is vented to the reservoir through the outlet port 210, the second inlet/outlet port 206, the first outlet port 184 of the three position direction control valve 178 and subsequently to the first drain port 188. Consequently, the right brake 28 is applied and the vehicle 12 pivot steers in the clockwise direction. If on the other hand, the operator moves the steer lever 216 to the counterclockwise position "CCW", the third inlet/outlet port 208 is in fluid communication with the right hand brake 28 through the first outlet port 210 while the left brake 30 is vented to the reservoir 146 through the second outlet port 212, first inlet/outlet port 204, the outlet port 184 of the three position direction control valve 178, and subsequently to the first drain port 188. With the valving element 214 of the three position steer control valve 199 in either of its clockwise or counterclockwise positions "CW,CCW", the branch internal passages 228,230 are effectively blocked. Therefore, the pressurized fluid from the pump 144 through the conduit 222 cannot be directed to the respective right and left brakes 28,30.

Upon movement of the direction lever 195 to the reverse position "R", the inlet port 182 of the three position direction control valve 178 is in open communication with the first outlet port 184 thereof while the second outlet port 186 thereof is in open communication with the second drain port 190. With the direction lever 195 in the reverse position "R", and the operator moves the steer lever 216 to the clockwise position "CW", the pressure signal "S" is directed from the first outlet port 184 of the three position direction control valve 178 simultaneously to the first and second inlet/outlet ports 204,206. The pressure signal "S" to the first inlet/outlet port 204 is blocked by the steer valving element 214 while the pressure signal to the second inlet/outlet port 206 is directed across the steer valving element 214 to the right brake 28. Simultaneously, the left brake 30 is vented to the reservoir through the second outlet port 212 of the three position steering control valve 199, the third inlet/outlet port 208, the second outlet port 186 of the three position direction control valve 178, and the second drain port 190. With the vehicle controls in the noted positions, the left brake 30 is applied and the vehicle 12 pivot steers in a clockwise direction.

Likewise, if the operator moves the steering lever 216 to the counterclockwise position "CCW", the pressure signal "S" from the first outlet port 184 of the three position direction control valve 178 is directed to the left brake 30 through the first inlet/outlet port 204 and the second outlet port 212. At the same time the right brake 28 is vented to the reservoir 146 through the first outlet port 210, the third inlet/outlet port 208 of the three position steer control valve 199, the second outlet port 186 of the three position direction control valve 178, and the second drain port 190. With the controls of the vehicle 12 in the noted positions, the right brake 28 is applied and the vehicle 12 pivot steers in a counterclockwise direction.

With the subject embodiment, as set forth in FIG. 4, the logic system thereof effectively selects the proper right or left brake 28,30 to be applied so the vehicle will pivot steer in either the clockwise or counterclockwise direction depending on the direction selected by the operator. In this embodiment, like that set forth in the previous embodiment, movement of the steer lever 216 towards either the clockwise or counterclockwise positions "CW,CCW" results in the vehicle steering through a degree of steer and upon reaching the brake applied range of travel "A" which corresponds to the clockwise "CW" or counterclockwise "CCW" positions, the respective right or left brake is applied as determined by the logic system.

For a better overall understanding of the control and logic systems 34,60 as set forth in the embodiments of FIGS. 2 and 4, the following table is provided:

| | BRAKE LOGIC | | |
|---|---|---|---|
| Steer Position | Travel Direction | Right Brake | Left Brake |
| N | N | OFF | OFF |
| N | F | OFF | OFF |
| N | R | OFF | OFF |
| CW | F | ON | OFF |
| CCW | F | OFF | ON |
| CW | R | OFF | ON |
| CCW | R | ON | OFF |
| CW | N | OFF | OFF |
| CCW | N | OFF | OFF |

The vehicle propulsion system 10, the control system 34, and the logic system 64 as set forth above provides an arrangement that enables the operator to independently, selectively apply either the right or left brake 28,30 in order to have better control of the vehicle 12 when operating in tight areas and on slopes. In order to ensure that the operator cannot independently apply one of the right or left brakes 28,30 when operating at higher ground speeds, the logic system 64 is only operable when the vehicle 12 is being operated in first gear.

Other aspects, objects and advantages of this invention can be obtained from the study of the drawings, the disclosure, and the appended claims.

We claim:

1. A control system and a logic system adapted for use in a vehicle having a source of control power operative to produce a control signal, right and left drive units operatively coupled with a transmission to provide directional control to the vehicle, right and left brakes for selectively stopping the respective right and left drive units, brake engagement actuation means for controlling engagement of the right and left brakes, and a differential steer means for providing a differential speed between the right and left drive units for steering of the vehicle, the control system includes input control means for conditioning the transmission to the selected direction, comprising:
   means for sensing a vehicle travel direction and for operatively transmitting the control signal from the source of control power therethrough responsive to the sensed travel direction of the vehicle; and
   means for sensing a vehicle steer direction and for operatively transmitting the control signal received from the vehicle travel direction sensing means to the brake engagement actuation means so that the right or left brake can be selectively, independently applied during steering of the vehicle.

2. The control and logic systems as set forth in claim 1, wherein the input control means includes a directional control mechanism moveable between neutral, forward, and reverse directional positions, and the vehicle travel direction sensing means includes direction switch means for selectively directing the control signal received from the source of control power thereacross and direction switch actuation means for conditioning the direction switch means to pass the control signal thereacross in response to the directional control mechanism of the transmission input control means being moved to one of the forward and reverse directional positions.

3. The control and logic systems as set forth in claim 2, wherein the control system includes a steer input means for establishing the direction of steer of the vehicle, the steer input means is operatively associated with the differential steer means and moveable between a neutral, clockwise, and counterclockwise steer positions, and the steer direction sensing means includes steer switch means for selectively directing the control signal received from the vehicle travel direction sensing means thereacross and steer switch actuation means for conditioning the steer switch means to pass the control signal thereacross in response to the steer input means being moved to one of the clockwise and counterclockwise steer positions.

4. The control and logic systems as set forth in claim 3, wherein the control signal is an electrical signal generated by an electrical output mechanism.

5. The control and logic systems as set forth in claim 4, wherein the direction switch means of the vehicle travel direction sensing means includes first and second normally open electrical switches and the direction switch actuation means of the vehicle travel direction sensing means includes first and second cams formed on the directional control mechanism of the input control means and the respective cams thereon are operative to close the respective first and second switches thereof when the directional control mechanism is moved from the neutral position towards the respective forward and reverse positions.

6. The control and logic systems as set forth in claim 5, wherein the steer switch means of the steer direction sensing means includes first, second, third, and fourth normally open electrical switches and the steer switch actuation means includes first, second, third, and fourth cams formed on the steer input means and the respective cams thereon are operative to close selective ones of the first, second, third, and fourth switches thereof when the steer input means is moved from the neutral position to the respective clockwise and counterclockwise steer positions.

7. The control and logic systems as set forth in claim 6, wherein during operation with the direction control mechanism the forward direction position and the steer input means in the clockwise steer position the right brake is engaged to brake the right drive unit.

8. The control and logic systems as set forth in claim 6, wherein during operation with the direction control mechanism in the reverse direction position and the steer input means in the clockwise steer position the left brake is engaged to brake the left drive unit.

9. The control and logic systems as set forth in claim 6, wherein during operation with the direction control mechanism in the forward direction position and the steer input means in the counterclockwise steer position the left brake is engaged to brake the left drive unit.

10. The control and logic systems as set forth in claim 6, wherein during operation with the direction control mechanism in the reverse direction position and the steer input means in the counterclockwise steer position the right brake is engaged to brake the right drive unit.

11. The control and logic systems as set forth in claim 6, including a control power switch between the source of the electrical signal and the vehicle travel direction sensing means, the transmission includes multiple speed ranges and the input control means of the control system includes a selector control means for selecting the speed of the transmission, the selector control means being moveable between first, second, and third speed positions and has a cam thereon operative to condition the control power switch to pass the electrical signal thereacross only when the selector control means is in the first speed position.

12. The control and logic systems as set forth in claim 11, including brake selector means for selecting the appropriate one of the brakes to apply, the brake selector means includes first and second two position, solenoid operated control valves, the right and left brakes are each spring applied and pressure released, and the flow of pressurized fluid thereto is selectively controlled by the respective first and second two position, solenoid operated control valves which are operative to vent pressurized fluid from a selected one of the spring applied, pressure released brake upon the solenoid thereof receiving the electrical signal from one of the normally open electrical switches of the steer direction sensing means.

13. The control and logic systems as set forth in claim 12, wherein the electrical output mechanism is a battery.

14. The control and logic systems as set forth in claim 3, wherein the control signal is a fluid signal generated by a source of pressurized fluid.

15. The control and logic systems as set forth in claim 14, wherein the input control means includes a directional control mechanism moveable between neutral, forward, and reverse directional positions and the vehicle travel direction sensing means includes a three position direction control valve moveable in response to the directional control mechanism and operative to selectively direct the fluid signal from the source of pressurized fluid thereacross in response to the directional control mechanism being moved to one of the forward and reverse directional positions.

16. The control and logic systems as set forth in claim 15, wherein the control system includes a steer input means for establishing the direction of steer of the vehicle, the steer input means is operatively associated with the differential steer means and moveable between a neutral, clockwise, and counterclockwise steer positions and the steer direction sensing means includes a three position steer control valve moveable in response to the steer input means and operative to selectively direct the fluid signal received from the three position direction control valve thereacross in response to the steer input means being moved to one of the clockwise and counterclockwise steer positions.

17. The control and logic systems as set forth in claim 16, wherein the three position direction control valve has an inlet port connectable to the source of pressurized fluid, first and second outlet ports, first and second drain ports, and a valving element moveable in response to the directional control mechanism between a neutral, forward and reverse directional positions; in the forward direction position, the inlet port is in communication with the second outlet port and the first outlet port is in communication with the first drain port; and in the reverse direction position thereof, the inlet port is in communication with the first outlet port and the second outlet port is in communication with the second drain port.

18. The control and logic systems as set forth in claim 17, wherein the three position steer control valve has an inlet port in fluid communication with the source of pressurized fluid, first and second inlet/outlet ports in fluid communication with the first outlet port of the three position direction control valve, a third inlet/outlet port in fluid communication with the second outlet port of the three position direction control valve, first and second outlet ports connectable to the respective right and left brakes, and a steer control valving element moveable in response to the steer input means between a neutral, clockwise, and counterclockwise steer positions; in the neutral position of the steer control valving element, the inlet port thereof is in open communication with the first and second outlet ports thereof; in the clockwise steer position, the inlet port is blocked from the first and second outlet ports, the first outlet port thereof is in communication with the second inlet/outlet port thereof, and the second outlet port thereof is in communication with the third inlet/outlet port thereof; and in the counterclockwise steer position thereof, the inlet port is blocked from the first and second outlet ports thereof, the second outlet port thereof is in communication with the first inlet/outlet port thereof, and the first outlet port thereof is in communication with the third inlet/outlet port thereof.

19. The control and logic systems as set forth in claim 14, wherein the source of pressurized fluid is hydraulic pump and including a control power switch located between the source of pressurized fluid and the vehicle travel sensing means.

20. The control and logic systems as set forth in claim 19, wherein the control power switch is a normally closed two position valve, the transmission has multiple speed ranges, and the input control means includes a selector control means for selecting the speed of the transmission, the selector control means being moveable between first, second, and third speed positions and having engagement means for moving the normally closed two position valve to its open position only when the selector control means is in the first speed position.

21. A control system and a logic system adapted for use in a vehicle having differential steer means for providing a differential speed between right and left drive units to steer the vehicle and right and left brakes to brake the right and left drive units, comprising:
    means for sensing a vehicle travel direction and for operatively transmitting a control signal therethrough responsive to the sensed direction of the vehicle; and means for sensing a vehicle steer direction and for operatively transmitting the control signal received from the vehicle travel direction sensing to a brake engagement actuation means so that the respective right or left brake can be applied in order for the right or left drive units to be selectively, independently braked during steering of the vehicle.

22. The control and logic systems as set forth in claim 21, wherein the control system includes a steer input means for establishing the direction and degree of steer of the vehicle, the steer input means is operatively associated with the differential steer means and moveable from a neutral position through a range of travel in a clockwise steer direction and a counterclockwise steer direction, and one drive unit of the right and left drive units is braked when the steer input means has been moved to an extreme position of the range of travel in either the clockwise steer direction or the counterclockwise steer direction.

23. The control and logic systems as set forth in claim 22, wherein the vehicle includes right and left spring applied, pressure released brakes operative to brake the respective right and left drive units in response to the steer input means being moved to either one of its respective extreme clockwise or counterclockwise positions.

24. In a vehicle propulsion system having a transmission to provide forward and reverse travel of the vehicle, right and left drive units operatively coupled with the transmission, and differential steer means for providing a differential speed between the right and left drive units for steering of the vehicle, the differential steer means is operatively coupled between the transmission and the right and left drive units; a control system including input control means for controlling a travel direction of the vehicle and steer input means for establishing a direction of steer, the input control means being operatively coupled with the transmission and moveable within an operative range, and the steer input means being operatively associated with the differential steer means and moveable within an operative range, the improvement comprising:

logic means for selectively, independently prohibiting movement of one of the right and left drive units in response to actuation of the input control means and the steer input means being moved to predetermined positions within its respective operative range.

25. The vehicle propulsion system as set forth in claim 24, including right and left brakes coupled with the respective right and left drive units and operative during use to brake the selected one of the right and left drive units in response to movement of the steer input means within its operative range.

26. The vehicle propulsion system as set forth in claim 25, including a source of control power for producing a control signal, and the logic means includes means for sensing a vehicle travel direction and for operatively transmitting the control signal from the source therethrough responsive to the sensed direction of travel.

27. The vehicle propulsion system as set forth in claim 26, wherein the logic means includes means for sensing a vehicle steer direction and for operatively transmitting therethrough the control signal received from the vehicle travel direction sensing and transmitting means to actuate the selected one of the right and left brakes.

28. The vehicle propulsion system as set forth in claim 27, including a control power switch between the source of control power and the vehicle travel direction sensing means, the transmission includes multiple speed ranges and the transmission input control means includes a selector control means for selecting the speed of the transmission, the selector control means being moveable between first, second, and third speed positions and operative to condition the control power switch to pass the control signal thereacross only when the selector control means is in the first speed position.

* * * * *